Feb. 28, 1967   E. H. DIEHM   3,306,674
LITTER CONVEYOR AND DISTRIBUTOR
Filed July 13, 1965   2 Sheets-Sheet 2

INVENTOR
EARL H. DIEHM

BY

ATTORNEY

United States Patent Office

3,306,674
Patented Feb. 28, 1967

3,306,674
LITTER CONVEYOR AND DISTRIBUTOR
Earl H. Diehm, 109 N. Main St., Manheim, Pa. 17545
Filed July 13, 1965, Ser. No. 471,591
2 Claims. (Cl. 302—37)

This invention pertains to conveying and distributing means for pulverulent type material, not especially of powder consistency, however, but which may be readily entrained in air currents for suitable handling of the material. Such material may also be considered somewhat of a flocculent nature, though not necessarily consisting of fibers. One very common type of material for which the present invention is particularly intended to be adapted is wood shavings either with or without certain proportions of sawdust or the like, including powdered bark, used, for example, as litter in poultry houses, bedding for cattle, and agricultural mulch. A layer of such litter upon the floor of a poultry house provides exercising means to cause the hens to scratch in the litter. One very common type of litter used for this purpose comprises mixtures of wood shavings, sawdust, and similar refuse material from woodworking plants and planing mills. Aside from such use, material of this type largely is of a waste nature, and yet it is highly suitable for use as litter in the above-described circumstances.

Heretofore, it has been common practice to handle litter of this type by distributing it in large bags. In view of the lightweight nature thereof, bags of considerable volumetric capacity may be used and still not be excessive in weight so as to prevent ready handling. However, the problem of distributing the contents of such bags is not so easily solved, especially when it is desired to spread a layer of such litter evenly upon the floor of a building such as a hen house. One method commonly practiced is to dump the bags of litter upon the floor and then rake or otherwise spread the same into a fairly even layer. This is time-consuming, not only requiring that the bags initially be filled but that the bags must be moved from a truck into the house in which the contents are to be distributed, for example, the bags emptied, and the piles of material then are leveled.

As far as is known, power-driven equipment has not heretofore been utilized to convey and distribute loose, relatively lightweight material of the type described. Accordingly, it is the principal purpose of the present invention to provide what is believed to be novel equipment, such as a large truck having a completely enclosed body, to transport loads of several hundred cubic feet of such material to the site where the material is to be distributed, the truck also containing blower means of the type specially designed to progressively withdraw the material from the stored body thereof in the truck, by suction means imparted to the material by a blower and said blower then is utilized to discharge the material quickly and in an even layer upon a floor by blowing the same through a large diameter flexible conduit of suitable length to extend from the body of the vehicle to the discharge end of the conduit which is readily capable of being taken into a poultry laying house, for example, and, by moving the discharge end of the conduit from side to side while the operator moves backwardly, a highly satisfactory layer of even thickness of said material can be deposited upon the floor in a single operation and requiring no additional finishing activity, such as by raking or otherwise.

It is another object of the invention to provide a specially adapted blower unit mounted preferably in a segregated compartment in the forward end of the body of a vehicle, such as a trailer of a tractor-trailer unit, said compartment also containing auxiliary power means to drive the blower and having a separate exhaust outlet for the power means which conveniently may be an internal combustion engine.

A further object of the invention is to provide discharge conduit means preferably extending upward an appreciable distance from the outlet of the blower unit and through the top of the body in which the compartment is located, and a flexible conduit of large diameter and serviceable length is connected to the upper, discharge end of said conduit means in order to conduct the material from said discharge conduit means to the discharge end of the flexible conduit when the same has been moved for operation into a structure upon the floor of which the material is to be distributed.

Details of the foregoing objects and of the invention, as well as other objects thereof, are set forth in the following specification and illustrated in the accompanying drawings comprising a part thereof.

In the drawings:

FIG. 4 is a vertical sectional view through the blower unit, as seen on the line 4—4 of FIG. 2 and illustrating an exemplary type of impeller which may be used satisfactorily in a blower of the type required for this invention.

Figure 1:
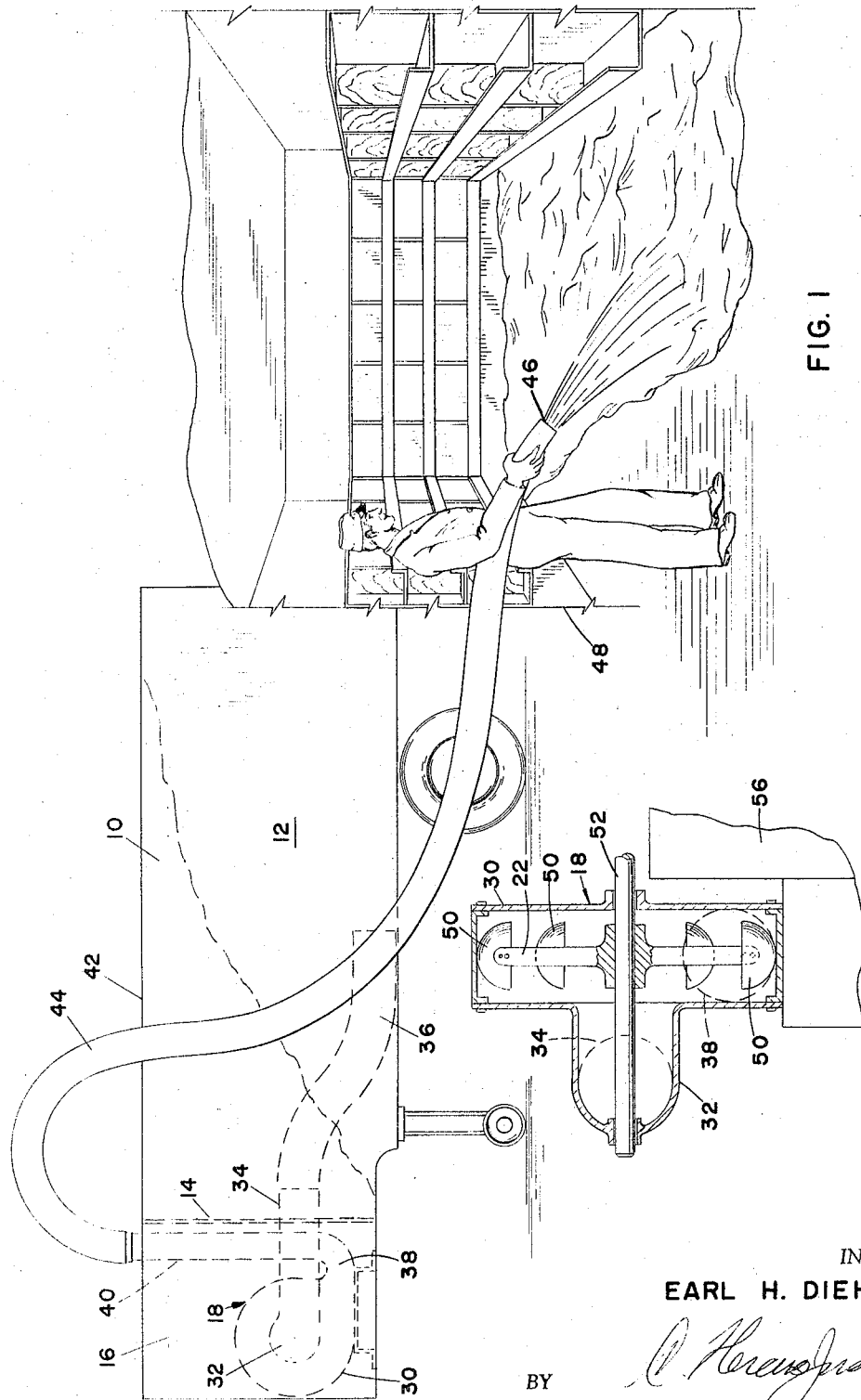
FIG. 1 is a partially schematic arrangement illustrating an exemplary side elevation of a trailer of a tractor-trailer unit in which litter material is outlined and discharge means for the material are illustrated as being directed onto the floor of a sectional view of an exemplary poultry laying house.

In view of the fact that lightweight, flocculent or pulverulent material, such as litter which may be composed of sawdust, wood shavings and the like, is of very fluff-like nature, very substantial quantities thereof may be hauled in a single vehicle such as a trailer body 10 of an exemplary tractor-trailer illustrated in FIG. 1. Even a very large capacity trailer may be utilized but preferably the body thereof is completely enclosed, including the roof, especially while the vehicle is being transported when loaded with the litter material 12. The body 10 may be loaded with the material in any convenient manner, such as by a conveyor, blower, or otherwise, as desired. The forward portion of the body 10 is sealed from the remainder thereof by a vertical partition 14 to provide a separate, forward compartment 16 within which the power equipment of the system is mounted. Since equipment of this type is relatively heavy, it is appropriate that the same be located at the forward portion of the body 10 which is directly over the rear axle of the tractor unit, where ample support is available.

Figure 2:
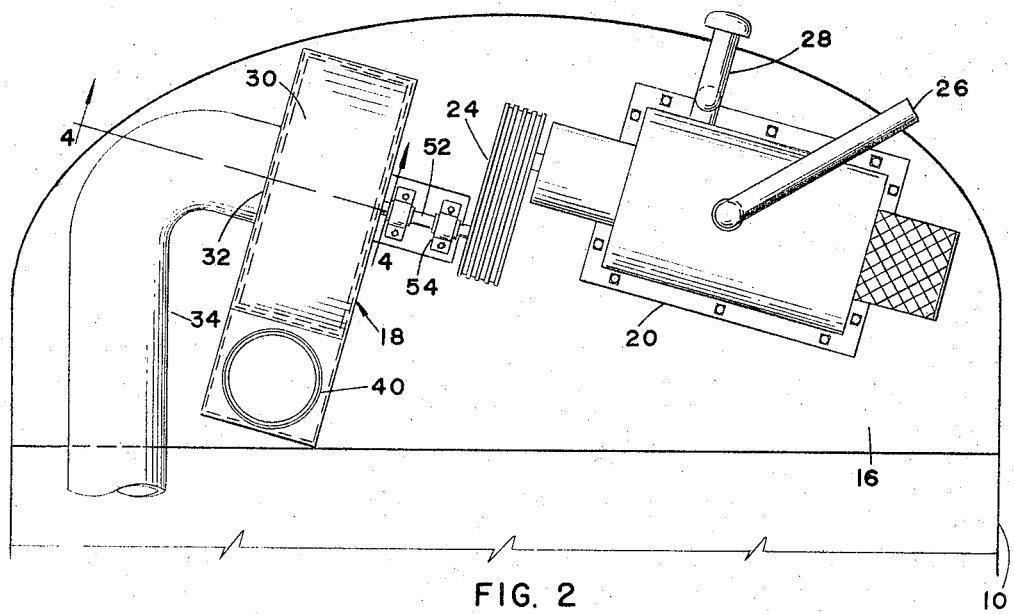
FIG. 2 is a fragmentary plan view of the forward end of the trailer shown in FIG. 1, with the top removed, and illustrating a preferred method of installing a blower and power unit to drive the same in a compartment provided at the forward end of said trailer.

The power equipment mounted within compartment 16 is compactly arranged therein as is evident from FIG. 2 in particular, and wherein it will be seen that said equipment comprises a blower 18 and power developing means, such as an internal combustion engine 20 of appropriate horsepower and speed rating to drive the impeller 22 of the blower unit 18 a desired speed through a multiple belt and sheave set 24 which are of such ratio as preferably to drive the impeller nearly twice the rate of speed of the engine.

Figure 3:
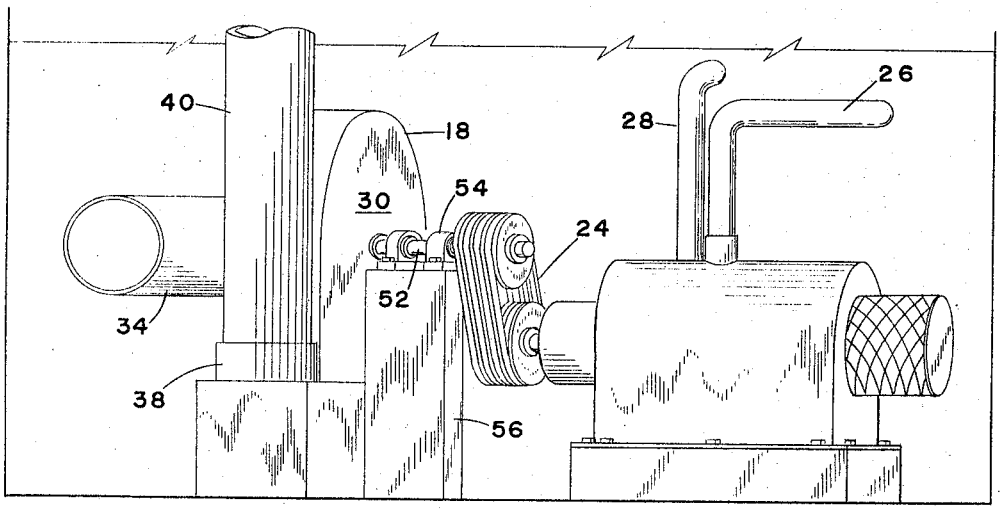
FIG. 3 is a vertical elevation of the blower and power unit shown in FIG. 2 with the upper portion of the compartment omitted.

The engine 20, as shown in FIGS. 2 and 3, has an exhaust 26 which extends through the front wall of the compartment 16 for discharge to the exterior thereof, and an air intake pipe 28 also extends from exteriorly of compartment 16 into the interior thereof to direct air to the carburetor of the engine.

The blower 18 has a substantially circular housing 30 and a central inlet 32 in the side thereof opposite the engine 20 for connection of an intake conduit 34 thereto of large capacity. An exemplary size which has been found to be highly satisfactory is a 10″ diameter tube, but it is to be understood that this dimension is exemplary and may be varied, depending upon the requirements of any particular distribution job. Connected to the inlet end of intake conduit 34 is a flexible conduit 36, preferably of similar capacity of the intake conduit 34 and the inlet end of the flexible conduit 36 is disposed within the body of the material 12 so as to have free access thereto for withdrawal of the material by suction for delivery to the impeller 22 of the blower.

As best shown in FIG. 1, the housing 30 of the blower 18 is provided with a discharge outlet 38 which extends tangentially, for example, from the lower portion of the housing 30 and discharges directly into a vertically extending discharge conduit 40, which preferably is rigid and extends through the top 42 of compartment 16. Such vertical discharge conduit 40 serves somewhat in the nature of a plenum chamber to reduce the velocity of the air-borne discharged material so that it does not exit from this conduit violently or with explosive force, as has been found to be the result if such arrangement is not utilized.

For final distribution of the discharged material, a flexible distributing conduit 44 is secured at the entrance end thereof to the upper end of the vertical discharge conduit 40. The distributing conduit 44 is also of substantial diameter, such as of the order of about 10″ and is formed either from rubberized fabric or the like so as to be impervious. An appropriate length thereof has been found to be 36′, this being adequate to enable an operator to move the discharge end 46 into the interior of an exemplary poultry laying house 48, for example, and, by advancing to the farthest wall of the room where the litter is to be distributed evenly upon the floor thereof, and by moving the discharge end 46 from side to side at suitable speed while gradually walking backward, it has been found that a floor of substantial area can be covered to a reasonable depth of a few inches within very few minutes time. By properly observing the thickness of the layer, an operator with only a very limited amount of training and skill can deposit such layer satisfactorily so that it needs no subsequent leveling operations, as is now one of the main portions of the labor involved in distributing litter according to current methods described in the introductory portion of this specification.

Although a number of different types of blowers, if of suitable capacity, may be employed to effect the delivery and distribution of the litter material in the manner described above, one preferred type of blower is illustrated in detail, in vertical section, in FIG. 4, wherein it will be seen that the impeller 22 comprises a number of radially extending arms on the outer ends of which somewhat semi-circular blades 50 are fixed. The impeller is fixed to a shaft 52 which is appropriately supported in bearings 54 fixed, for example, to the upper end of a suitable supporting standard 56.

In addition to the mechanism described hereinabove primarily being designed to withdraw the material 12 from the vehicle body 10 by suction to intake conduit 36 and discharge the same through the distributing conduit 44, it is also possible, by reversing the action of the blower 30 suitably, such as by employing appropriate reversing transmission, not shown, for example, the same structure may be used to remove litter and the like either from the floor of a poultry house or other structure and discharge the same into a suitable receptacle such as the body of a vehicle.

While the present invention has been described as being suitable to distribute litter for poultry use, there are other uses therefor in which the present invention is useful such as for cattle bedding. Shredded bark and the like, which also is readily handled by the subject apparatus is widely used for agricultural mulching and can be very effectively and efficiently distributed by such apparatus.

While the invention has been described and illustrated in its several preferred embodiments, it should be understood that the invention is not to be limited to the precise details herein illustrated and described since the same may be carried out in other ways falling within the scope of the invention as claimed.

I claim:

1. Portable mechanism to distribute bulk litter material evenly over a floor surface comprising in combination, a wheeled vehicle having a large enclosed body to contain a bulk supply of said material, a blower mounted on said vehicle adjacent one end thereof and having an inlet and a discharge outlet, power means carried by said vehicle and connected to said blower to drive it, a large diameter flexible suction conduit connected at one end to said blower inlet and the other end thereof extending toward said enclosed body and into the bulk material within said body, a discharge conduit extending upwardly from said blower outlet to serve as plenum means to render the discharge of material from said blower smooth and even, and a relatively long and flexible distributing hose of a diameter of at least 8″ connected at the inlet end thereof to the upper end of said discharge conduit and the discharge end thereof being manually and flexibly movable by an attendant to distribute litter material to an even depth over a floor surface without subsequent leveling or smoothing operations.

2. The distributing mechanism of claim 1 in which said vehicle is a roofed automotive truck, said power means is an auxiliary engine carried by the bed of said vehicle adjacent said blower and said discharge conduit is a tube extending substantially as high as the roof of said compartment of said vehicle, substantially above the level of the discharge end of said hose.

References Cited by the Examiner

UNITED STATES PATENTS

| 1,844,065 | 2/1932 | Heintz et al. | 302—37 |
| 2,116,603 | 5/1938 | Holly | 302—52 |
| 2,893,741 | 7/1959 | Pilch | 302—52 |

ANDRES H. NIELSEN, *Primary Examiner.*